United States Patent [19]

Goyert et al.

[11] 4,261,946

[45] Apr. 14, 1981

[54] PROCESS FOR THE PRODUCTION OF THERMOPLASTIC POLYMER BY INTRODUCING THERMOPLASTIC POLYMER INTO AN EXTRUDER AND ADDING ORGANIC POLYISOCYANATE AND CHAIN LENGTHENING AGENT

[75] Inventors: Wilhelm Goyert, Cologne; Ernst Meisert; Wolfgang Grimm, both of Leverkusen; Alfred Eitel, Dormagen; Hans Wagner, Dormagen; Georg Niederdellmann, Dormagen; Bernd Quiring, Leverkusen, all of Fed. Rep. of Germany

[73] Assignee: Bayer Aktiengesellschaft, Leverkusen, Fed. Rep. of Germany

[21] Appl. No.: 103,002

[22] Filed: Dec. 13, 1979

[30] Foreign Application Priority Data

Dec. 16, 1978 [DE] Fed. Rep. of Germany ....... 2854386

[51] Int. Cl.$^3$ .............................................. D01F 1/02
[52] U.S. Cl. .................................... 264/211; 260/13; 525/53; 525/66; 525/131; 525/424; 525/440; 525/458
[58] Field of Search .......................... 264/211; 260/13; 525/53, 66, 131, 424, 440, 458

[56] References Cited

U.S. PATENT DOCUMENTS

| 3,049,505 | 8/1962 | Grabowski | 260/40 TN |
|---|---|---|---|
| 3,170,972 | 2/1965 | Knipp et al. | 264/54 |
| 3,697,483 | 10/1972 | Damusis | 525/458 |
| 3,718,713 | 2/1973 | Tanaka et al. | 525/424 |
| 3,892,820 | 7/1975 | Goto et al. | 525/424 |
| 3,963,679 | 6/1976 | Ullrich et al. | 264/211 |
| 3,984,607 | 10/1976 | Thoma et al. | 428/425 |
| 4,021,378 | 5/1977 | Frisch et al. | 525/440 |
| 4,035,213 | 7/1977 | Thoma et al. | 428/424 |
| 4,129,611 | 12/1978 | Heiss | 525/458 |

FOREIGN PATENT DOCUMENTS

| 1028908 | 5/1966 | United Kingdom . |
|---|---|---|
| 1317091 | 5/1973 | United Kingdom . |
| 1508317 | 4/1978 | United Kingdom . |

Primary Examiner—Maurice J. Welsh
Attorney, Agent, or Firm—Gene Harsh; Joseph C. Gil; R. Brent Olson

[57] ABSTRACT

The instant invention is directed to a process for the modification of a thermoplastic polymer comprising:

I. introducing 70 to 98 parts by weight of thermoplastic polymer into an extruder at a first inlet;

II. adding to said thermoplastic polymer through a second inlet 2 to 30 parts by weight of the following polyurethane forming components, such that the total parts by weight of the thermoplastic polymer and polyurethane components is 100:

(A) organic polyisocyanate; and (B) chain lengthening agent with a molecular weight below 400 containing at least one hydroxyl group and/or amino group;

wherein the ratio of isocyanate groups of component (A) to Zerewitinoff active groups of component (B) is in the range of from 0.90:1 to 1.2:1; and III. discharging from the extruder the product of the process.

13 Claims, No Drawings

PROCESS FOR THE PRODUCTION OF THERMOPLASTIC POLYMER BY INTRODUCING THERMOPLASTIC POLYMER INTO AN EXTRUDER AND ADDING ORGANIC POLYISOCYANATE AND CHAIN LENGTHENING AGENT

BACKGROUND OF THE INVENTION

This invention relates to a process for improving the mechanical properties of thermoplastic polymers by reacting polyisocyanates with low molecular weight chain lengthening agents in the molten thermoplast inside a screw extruder. Hard segments are thereby formed in the thermoplast and a thermoplastic mixed polymer with improved hardness and strength is obtained.

Processes for the continuous production of thermoplastic polyurethanes in double shaft screw extruders with self-cleaning screws by the reaction of relatively high molecular weight polyhydroxyl compounds, polyisocyanates and chain lengthening agents have been disclosed in German Offenlegungsschriften Nos. 2,302,564 (U.S. Pat. No. 3,963,679); 2,423,764; and 2,549,372. In these processes, the reaction mixture must be mixed vigorously inside the screw extruder with the aid of kneading elements at a stage in which the melt still has a low viscosity (about 20 to 70 Pa.s) so as to avoid inhomogeneity in the end product. According to one variation of these processes, aggregates such as thermoplasts may be mixed with the product in the screw extruder during or after the reaction but there is no indication in these publications that the mechanical properties of thermoplasts could be improved by the controlled incorporation of polyurethane hard segments.

U.S. Pat. No. 3,049,505 and German Offenlegungsschrift No. 1,570,073 relate to mixtures of thermoplastic polyurethanes and graft copolymers which are distinguished by their high tensile strength at break. These publications, however, give no indication that such mixtures could be prepared in a screw reactor or that a hard polyurethane could be produced in the presence of the graft copolymer.

German Offenlegungsschrift No. 2,011,508 relates to a process for the production of very hard thermoplastic polyurethane elastomers from softer thermoplastic polyurethanes by mixing the soft polyurethanes with from 5 to 50% by weight of "hard components" as fillers. These "hard components" are reaction products of diisocyanates with low molecular weight glycols. No mention is made in the publication, however, of the use of screw reactors. Since the finished hard components are added as fillers in the process according to German Offenlegungsschrift No. 2,011,508, the end products obtained are relatively inhomogeneous and have unsatisfactory strength properties. By contrast, in the process according to the present invention, the hard component is formed inside a screw reactor in the presence of the previously prepared softer thermoplast. This results in completely homogeneous products of high strength.

DESCRIPTION OF THE INVENTION

The present invention relates to the modification of a thermoplastic polymer comprising:

I. introducing 70 to 98 parts by weight, preferably 80 to 96 parts by weight, of thermoplastic polymer into an extruder, preferably a multishaft extruder, most preferably a double shaft screw extruder with self-cleaning screws, at a first inlet, wherein the temperature in the extruder is such that said thermoplastic polymer melts;

II. adding to said molten thermoplastic polymer through a second inlet, and optionally other inlets, 2 to 30 parts by weight, preferably 4 to 20 parts by weight, of the following polyurethane forming components, such that the total parts by weight of thermoplastic polymer and polyurethane components is 100:

(A) organic polyisocyanate, preferably diisocyanate;
(B) chain lengthening agent with a molecular weight below 530, preferably below 400, in particular below 250, containing a hydroxyl group and/or an amine group, wherein the ratio of isocyanate groups of component (A) to Zerewitinoff active groups of component (B) is in the range of from 0.90:1 to 1.2:1, preferably 0.95:1 to 1.1:1; and III. discharging from the extruder the product of the process.

By means of the in situ formation of relatively small quantities of hard segments in a previously prepared thermoplast, it is possible to produce very rigid and highly elastic materials from thermoplastic materials which have only moderate hardness and strength. By introducing two or more polyisocyanates into the polymer structure, it is possible to obtain products with a very wide melting range.

The previously prepared thermoplastic polymers which may be used according to the invention include in particular the known thermoplastic polyurethanes which may be obtained, for example, in accordance with British Pat. No. 1,057,018; German Auslegeschriften Nos. 1,106,559; 1,157,772; and 1,165,852; and German Offenlegungsschriften Nos. 2,302,564; 2,423,764; and 2,549,372 (U.S. Pat. No. 3,963,679); and 2,402,864 (U.S. Pat. No. 3,984,607) as well as German Auslegeschrift No. 2,457,387 (U.S. Pat. No. 4,035,213), using the starting materials described there.

Other thermoplasts may also be used according to the invention, for example, the known ABS graft copolymers. These are elastic-thermoplastic products which are synthesized mainly from the monomers, acrylonitrile (A), butadiene (B) and styrene or -methylstyrene (S). B may be partly or completely replaced by other rubber components, e.g., by a EPDM rubber to produce a so-called AES polymer. These polymers are prepared by the known methods of emulsion, suspension, solvent free or solution polymerization or combination of these methods, as described, e.g., by V. H. Basdekis in "ABS-Plastics", Reinhold Publishing Corporation, New York, 1964.

Other thermoplasts suitable for the purpose of the invention are polyethylene and polypropylene (polymers of this type, however, should not be used in the process according to the invention in a quantity of more than 10% by weight, based on the total end product of the process), copolymers of ethylene and other olefinically unsaturated monomers, polybutene-(1), polymethylpentone, polystyrene (in particular high impact strength polystyrene), PVC, polymethacrylic acid methyl ester, polyamides, aromatic polyethers (e.g., polyphenylene oxide), polyesters of terephthalic acid and optionally isophthalic acid as well as butylene glycol and/or ethylene glycol, polybutylene glycol terephthalic containing polyether soft segments, cellulose esters (e.g., cellulose acetate, propionate or acetobutyrate), styrene/butadiene (graft) copolymers (which may be mixed with other polymers), and poly-propylene and ethylene-propylene copolymers mixed with EPM and/or EPDM rubbers. Polymers of this type have been described, e.g., by Vieweg et al in "Kunststoff-Handbuch", Vols. II, IV-VII, IX and XI, publishers Carl Hanser-Verlag, Munich, 1963-1971, and by Hansjurgen Saechtling in "Kunststofftaschenbuch", 20th edition, publishers Carl Hanser-Verlag, Munich-Vienna, 1977.

ABS polymers which are preferred according to the invention consists of mixtures of
(a) 5 to 70% by weight of one or more graft products and
(b) 95 to 30% by weight of one or more thermoplastic resins.

Graft products (a) are preferably polymers obtained by the polymerization of graft monomers in the presence of a rubber used as graft basis. The proportion of rubber is about 5 to 80% by weight and is partly determined by the polymerization process.

The substances which may be used as graft bases include in particular polybutadiene, butadiene/acrylonitrile and butadiene/styrene polymers and butadiene-styrene block polymers. The graft monomers used are mainly styrene, mixtures of styrene and acrylonitrile, preferably in proportion by weight in the range of 90:10 to 50:50, mixtures of styrene and methyl methacrylate, preferably in proportions by weight ranging from 5:95 to 95:5, and mixtures of styrene, acrylonitrile and methyl methacrylate.

The thermoplastic resin (b) which is the second component of the ABS polymers forms the continuous phase (matrix) and may be, for example, a polymer or copolymer of styrene, α-methylstyrene, acrylonitrile, methyl methacrylate or maleic acid anhydride. Polystyrene, styrene/acrylonitrile copolymers containing from 20 to 35% by weight of acrylonitrile and α-methylstyrene/acrylonitrile copolymers containing from 20 to 31% by weight of acrylonitrile area preferred. The average molecular weight of these resins is generally from 50,000 to 550,000. The molecular non-uniformity, expressed by the term $(M_w/M_n)-1 = U_n$ is 1.0 to 3.5.

According to the invention, however, component (a) may be used as the only thermoplast.

Thermoplast polycarbonates which may be used according to the invention include the polycondensates obtained by the reaction of dihydroxydiarylalkanes with phosgene or diesters of carbonic acid. Not only the unsubstituted dihydrodiarylalkanes are suitable but also those in which the aryl groups carry methyl groups or halogen atoms in the ortho- and/or meta-position to the hydroxyl group. Branched chain polycarbonates are also suitable. These generally have average molecular weights of from 10,000 to 100,000, preferably from 20,000 to 40,000.

Suitable aromatic dihydroxy compounds include, e.g., hydroquinone; resorcinol; 4,4'-dihydroxydiphenyl; bis-(hydroxyphenylalkanes) such as $C_1$-$C_8$-alkylene- or $C_2$-$C_8$-alkylidene-bisphenols; bis-(hydroxyphenyl)-cycloalkanes such as $C_5$-$C_{15}$-cycloalkylene- or $C_5$-$C_{15}$-cycloalkylidene-bisphenols; and bis(hydroxyphenyl)-sulphides, -ethers, -ketones, -sulfoxides or -sulfones. α,α'-bis-(hydroxyphenyl)-diisopropylbenzene and its derivatives substituted with alkyl groups or halogen atoms in the ortho- and/or meta-position to the hydroxyl group or the isopropyl groups are also suitable. It is preferred to use polycarbonates based on bis-(4-hydroxyphenyl)-propane-(2,2) (bisphenol A), bis-(4-hydroxy-3,5-dichlorophenyl)-propane-(2,2) (tetrachloro-bisphenol A), bis-(4-hydroxy-3,5-dibromophenyl)-propane-(2,2) (tetrabromo-bisphenol A), bis-(4-hydroxy-3,5-dimethyl-phenyl)-propane-(2,2) (tetramethylbisphenol A), bis-(4-hydroxyphenyl)-cyclohexane-(1,1) (bisphenol Z); and those based on tri-nuclear bisphenols, such as α,α'-bis-(4-hydroxyphenyl)-p-diisopropylbenzene. Other bisphenols suitable for the preparation of polycarbonates have been described in U.S. Pat. Nos. 3,028,365; 2,999,835; 3,148,172; 3,271,368; 2,970,137; 2,991,273; 3,271,367; 3,280,078; 3,014,891; and 2,999,846.

The compounds used as isocyanate component (A) for the process according to the invention may be aliphatic, cycloaliphatic, araliphatic, aromatic or heterocyclic polyisocyanates which have been described, e.g., by W. Siefken in Justus Liebigs Annalen der Chemie, 562, pages 75 to 136, for example those corresponding to the following formula:

in which
n=2 to 4, preferably 2,
and
Q represents an aliphatic hydrocarbon group having 2 to 18 preferably 6 to 10 carbon atoms; a cycloaliphatic hydrocarbon group having 4 to 15, preferably 5 to 10 carbon groups; an aromatic hydrocarbon group having 6 to 15, preferably 6 to 13 carbon atoms; or an aliphatic hydrocarbon group having 8 to 15, preferably 8 to 13 carbon atoms. Examples include the following: ethylene diisocyanate, 1,4-tetramethylene diisocyanate, 1,6-hexamethylene diisocyanate, 1,12-dodecane diisocyanate, cyclobutane-1,3-diisocyanate, cyclohexane 1,3- and 1,4-diisocyanate and any mixtures of these isomers, 1-isocyanato-3,3,5-trimethyl-5-isocyanato-methyl cyclohexane (German Auslegeschrift No. 1,202,785, and U.S. Pat. No. 3,401,190); 2,4- and 2,6-hexahydrotolylene diisocyanate and any mixtures of these isomers; hexahydro-1,3- and/or 1,4-phenylenediisocyanate, perhydro-2,4'- and/or 4,4'-diphenylmethane-diisocyanate; 1,3- and 1,4-phenylene diisocyanate; 2,4- and 2,6-tolylene diisocyanate and any mixtures of these isomers, diphenylmethane 2,4'- and/or 4,4'-diisocyanate and naphthylene-1,5-diisocyanate.

The following, for example, may also be used according to the invention: triphenyl methane-4,4',4''-triisocyanate, polyphenyl-polymethylene polyisocyanates, which may be obtained by aniline-formaldehyde condensation followed by phosgenation (British Pat. Nos. 874,430 and 848,671); m- and p-isocyanatophenyl sulfonyl isocyanates (U.S. Pat. No. 3,454,606); perchlorinated aryl polyisocyanates (German Auslegeschrift No. 1,157,601 and U.S. Pat. No. 3,277,138); polyisocyanates with carbodiimide groups (German Pat. No. 1,092,007; U.S. Pat. No. 3,152,162; and German Offenlegungsschriften Nos. 2,504,400; 2,537,685; and 2,552,350); norbornane diisocyanates (U.S. Pat. No. 3,492,330); polyisocyanates with allophenate groups (British Pat. No. 994,890; Belgian Pat. No. 761,626 and Dutch patent application No. 7,102,524); polyisocyanates with isocyanurate groups (U.S. Pat. No. 3,001,973; German Pat. Nos. 1,022,789; 1,222,067; and 1,027,394; and German Offenlegungsschriften Nos. 1,929,034 and 2,004,048); polyisocyanates with urethane groups (Belgian Pat. No. 752,261 and U.S. Pat. Nos. 3,394,164 and 3,644,457); polyisocyanates with acylated urea groups (German Pat. No. 1,230,778); polyisocyanates with biuret groups (U.S. Pat. Nos. 3,124,605 and 201,372; and British Pat. No. 889,050); polyisocyanates prepared by a telomerization reaction (U.S. Pat. No. 3,654,106), polyisocyanates with ester groups (British Pat. Nos. 965,474 and 1,231,688); reaction products of the above-mentioned isocyanates with acetals (German Pat. No. 1,072,385) and polyisocyanates containing polymeric fatty acid esters (U.S. Pat. No. 3,455,883).

The distillation residues obtained from the commercial production of isocyanates and still containing isocyanate groups may also be used, dissolved in one or more of the above-mentioned polyisocyanates. Any mixtures of the above-mentioned polyisocyanates may also be used.

The following polyisocyanates are preferred: naphthylene-1,5-diisocyanate, 2,4- and/or 2,6-tolylene diisocyanate; isophorone diisocyanate and, particularly 4,4'-diphenylmethane diisocyanate and hexamethylene diisocyanate.

If the isocyanate component used includes polyisocyanates with a relatively high functionality, care must be taken to ensure that not too many branching positions are introduced into the polyurethane so that the product discharged from the screw extruder will still be fusible or thermoplastic. If a relatively large quantity of isocyanates with a high functionality is used, this must generally be balanced by the inclusion of monoisocyanates or of hydroxyl or amino compounds with an average functionality less than 2, so as to avoid excessive chemical cross-linking product leaving the screw extruder. It is, of course, also possible to carry out the reaction in such a manner that chemical cross-linking takes place subsequently during storage of the elastomer, for example by using an excess of compounds containing isocyanate groups.

The compounds which may be used as chain lengthening agents (B) according to the invention include compounds with a molecular weight of from 32 to 400, preferably 62 to 250, containing hydroxyl group and/or amino groups. These compounds generally have from 2 to 4, preferably 2, isocyanate reactive hydrogen atoms. Mixtures of such compounds may, of course, be used. The following are examples of such compounds: ethylene glycol; propyleneglycol-(1,2) and (1,3); butyleneglycol-(1,4) and -(2,3); pentanediol-(1,5); hexandiol-(1,6); octanediol-(1,8); neopentylglycol; 1,4-bis-hydroxymethylcyclohexane; 2-methyl-1,3-propanediol; dibromobutenediol (U.S. Pat. No. 3,723,392); glycerol; trimethylolpropane; hexanetriol-(1,2,6); trimethylolethane; diethylene glycol triethylene glycol; tetraethylene glycol; higher polyethylene glycols with molecular weights up to 400; dipropylene glycol; higher polypropylene glycols with molecular weights up to 400; dibutylene glycol; higher polybutylene glycols with molecular weights up to 400; 4,4'-dihydroxy-diphenyl-propane; dihydroxymethyl-hydroquinone; ethanolamine; diethanolamine; N-methyldiethanolamine; triethanolamine; 3-aminopropanol and hydroquinone-bis-hydroxyethyl ether.

The following are examples of suitable aliphatic diamines for use in the process of invention: ethylene diamine; 1,4-tetramethylenediamine; 1,11-undecamethylene diamine; 1,12-dodecamethylenediamine and mixtures thereof; 1-amino-3,3,5-trimethyl-5-aminomethylcyclohexane ("isophorone diamine"), 2,4- and 2,6-hexahydrotolylene diamine and mixtures thereof; perhydro-2,4' (4,4'-diaminodiphenyl methane; p-xylylene diamine; bis-(3-aminopropyl)-methylamine, diamino-perhydroanthracene (German Offenlegungsschrift No. 2,638,731) and cycloaliphatic triamines (German Offenlegungsschrift No. 2,614,244). Hydrazines and substituted hydrazines (such as methylhydrazines and N,N'-dimethylhydrazines, and their homologues or acid dihydrazides) may also be used according to the invention, e.g., carbodihydrazide; oxalic acid dihydrazide; the dihydrazides of malonic acid, succinic acid, glutaric acid, adipic acid, β-methyladipic acid, sebacic acid, hydracrylic acid and terephthalic acid; semicarbazido-alkylene hydrazides, e.g., β-semicarbazidopropionic acid hydrazide (German Offenlegungsschrift No. 1,770,591), semicarbazido-alkylene carbazic esters, e.g., 2-semicarbazidoethyl-carbazic esters (German Offenlegungsschrift No. 1,918,504) or also aminosemicarbazide compounds, e.g., β-aminoethyl-semicarbazidocarbonate (German Offenlegungsschrift No. 1,902,931).

Examples of suitable aromatic diamines include bis-anthranilic acid esters (German Offenlegungsschriften Nos. 2,040,644 and 2,160,590); 3,5- and 2,4-diaminobenzoic acid esters (German Offenlegungsschrift No. 2,025,900); the diamines with ester groups described in German Offenlegungsschriften Nos. 1,803,635 (U.S. Pat. Nos. 3,681,290 and 3,736,350); 2,040,650 and 2,160,589; the diamines with ether groups according to German Offenlegungsschriften Nos. 1,770,525 and 1,809,172 (U.S. Pat. Nos. 3,654,364 and 3,736,295); 2-halogen-1,3-phenylene diamine optionally substituted in the 5-position (German Offenlegungsschriften Nos. 2,001,772; 2,025,896 and 2,065,869); 3,3'-dichloro-4,4'-diamino-diphenylmethane; tolylene diamine; 4,4'-diaminophenylmethane; 4,4' -diamino-diphenyldisulfides (German Offenlegungsschrift No. 2,404,976); diaminodiphenyldithioethers (German Offenlegungsschrift No. 2,509,404); aromatic diamines substituted by alkalthio groups (German Offenlegungsschrift No. 2,638,760) diaminobenzene-phosphonic acid esters (German Offenlegungsschrift No. 2,459,491); aromatic diamines containing sulfonate or carboxylate groups (German Offenlegungsschrift No. 2,720,166) and the high melting diamines mentioned in German Offenlegungsschrift No. 2,635,400. The aminoalkyl thioanilines according to German Offenlegungsschrift No. 2,734,574 are examples of aliphatic-aromatic diamines.

Compounds which are monofunctional in their reaction with isocyanates may also be used as so-called chain breakers in proportions of from 0.01 to 10% by weight, based on the polyurethane solids content. Examples of such monofunctional compounds include monoamines (such as butylamine, dibutylamine, octylamine, stearylamine, N-methylstearylamine, pyrrolidine, piperidine and cyclohexylamine), monohydric alcohols (such as butanol, 2-ethylhexanol, octanol dodecanol) and various amyl alcohols (cyclohexanol and ethylene glycol monoethylether).

In the same way as in the case of isocyanates with a high functionality, it is necessary, when using alcohols or amines with a functionality higher than two, to prevent excessive chemical cross-linking of the polyurethane.

Other low molecular weight polyols with molecular weights of up to 400 which are suitable for the purpose of the invention include, e.g., esterdiols corresponding to the following general formulae:

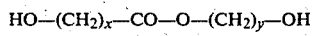

and

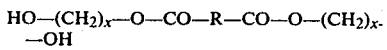

in which
- R represents an alkylene group having 1 to 10, preferably 2 to 6 carbon-atoms or a cycloalkylene or arylene group having 6 to 10 carbon-atoms,
- x=2 to 6 and
- y=3 to 5, e.g. 5-hydroxybutyl-ε-hydroxy-caproic acid esters; ω-hydroxyhexyl-γ-hydroxybutyric acid esters; adipic acid-bis-(β-hydroxyethyl) ester and terephthalic acid-bis-(β-hydroxyethyl) ester; diolurethanes corresponding to the following general formula:

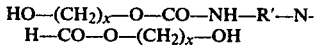

in which
- R' represents an alkylene group having 2 to 15, preferably 2 to 6 carbon atoms or a cycloalkylene or arylene group having 6 to 15 carbon atoms and
- x represents an integer of from 2 to 6, e.g. 1,6-hexamethylene-bis-(β-hydroxyethylurethane) or 4,4'-diphenylmethane-bis-(5-hydroxybutylurethane);

and diolureas corresponding to the following general formula:

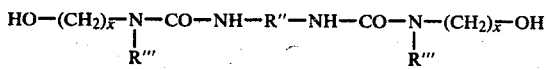

in which
- R" represents an alkylene group having 2 to 15, preferably 2 to 9 carbon atoms or a cycloalkylene or arylene group having 6 to 15 carbon atoms,
- R''' represents hydrogen or a methyl group and
- x represents 2 or 3, e.g., 4,4'-diphenylmethane-bis-(β-hydroxyethylurea) or the compound corresponding to the following formula:

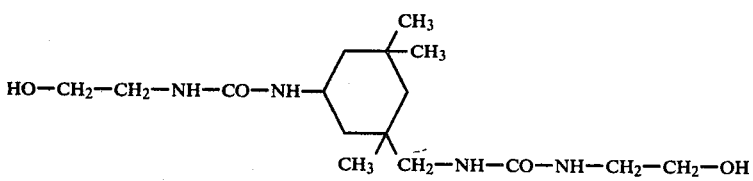

The following chain lengthening agents are preferred according to the invention: ethylene glycol; diethylene glycol; butanediol-(1,4); hexanediol-(1,6); octanediol-(1,8); and hydroquinone-dihydroxyethylether. Butanediol-(1,4) and hexanediol-(1,6) are particularly preferred.

In addition to components (A) and (B), substantially linear polyols with molecular weights from 400 to 10,000, preferably from 450 to 6,000, may be used as a third component in the process according to the invention (up to 80% by weight, preferably less than 50% by weight, in particular less than 30% by weight, based on the total amount of polyurethane forming components). Almost any polyesters, polylactones, polyethers, polythioethers, polyester amides, polycarbonates, polyacetals or vinyl polymers may be used as these additional components. They preferably contain two Zerewitinoff active hydrogen atoms, principally hydroxyl groups, and may also contain minor quantities of compounds of this type containing three such Zerewitinoff active hydrogen atoms. Examples include polybutadiene diols; polyhydroxyl compounds already containing urethane or urea groups; modified or unmodified natural polyols; and compounds containing other Zerewitinoff active groups such as amino, carboxyl or thiol groups. These compounds are known in the art and have been described in some detail, e.g., in German Offenlegungsschriften Nos. 2,302,564; 2,423,764; and 2,349,372 (U.S. Pat. No. 3,963,679) and 2,402,840 (U.S. Pat. No. 3,984,607) and in German Auslegeschrift No. 2,457,487 (U.S. Pat. No. 4,035,213).

When calculating the NCO/OH equivalent ratio or quantitative proportion of previously prepared thermoplastic polymer or polyurethane formed in situ, the quantity of these additional relatively high molecular weight polyols must be added to the quantity of chain lengthening agent (B).

The reaction of the polyisocyanates with chain lengthening agents carried out according to the invention may, if desired, be accelerated with known catalysts, generally in quantities of from 1 ppm to 1000 ppm. The following are examples of suitable catalysts: salts of the alkali metal and alkaline earth metals; organic metal compounds such as zinc octoate, tin octoate, dibutyl tin-IV-dilaurate, iron acetylacetonate, titanium tetrabutylate, and dioctyl tin-(IV) diacetate; and tertiary amines such as triethylamine, N-methylmorpholine, N,N,N',N'-tetramethyl-ethylenediamine, diazabicyclooctane, N,N'-dimethylbenzylamine and 2-methylimidazole. It is generally not necessary to use catalysts for producing hard products. Other representatives of catalysts which may be used according to the invention and details concerning the action of the catalysts may be found in Kunststoff-Handbuch, Volume VII, published by Vieweg and Höchtlen, Carl-Hanser-Verlag, Munich 1966, on pages 96 to 102.

The process according to the invention may also be carried out in the presence of known lubricants (e.g., polyolefins, polyalkylene oxides, polyalkylene esters, polyalkylene amides and similar waxes), stabilizers, inorganic and organic fillers, pigments and dyes, plasticizers, inert organic solvents, and the like.

The process for carrying out the invention will now be discussed.

The thermoplastic polymer which is to be modified is introduced into the intake zone of the extruder. The temperature of the housing of the extruder is chosen so that the thermoplast melts. The starting compounds which are to form the hard component are then introduced at another feed inlet, either already mixed or separately, and thus added to the molten thermoplastic polymer. Alternatively, however, the components which are to form the polyurethane may be injected into the extruder in several portions through several feed points. A preferred embodiment is to introduce the chain lengthening agent and a portion of the isocyanate at one feed point and to introduce the remainder of the isocyanate at a later feed point.

As already mentioned above, the apparatus used for the process according to the invention are preferably double shaft screw extruders with self-cleaning screws, although the reaction may be carried out partially in a multi-shaft, preferably a two-shaft screw extruder and the reaction mixture may subsequently be reacted in a single shaft extruder.

Suitable screw extruders have been described, for example, in German Pat. Nos. 813,154; 862,668; and 940,109; German Offenlegungsschrift No. 2,302,564 (U.S. Pat. No. 3,963,679) and U.S. Pat. Nos. 3,233,025, 3,642,964, 3,392,962 and 3,764,114, herein incorporated by reference.

The dwell times of the molten reaction mixture in the screw extruder are generally in the range of from 0.3 to 30 minutes, preferably from 0.5 to 4 minutes. The temperature of the screw housing is in the range of about 60° to 300° C. (about 80° to 280° C. in the intake zone; about 100° to 300° C. in the middle of the extruder and about 60° to 250° C. in the discharge zone). The melt leaving the extruder is chilled and broken down into small pieces by known methods. The products of the process may be worked up thermoplastically or in solution in the usual manner to form films, gear wheels, cable sheaths, seals, etc.

The following Examples serve to explain the process of the invention. Quantities given are to be understood as parts by weight or percentage by weight unless otherwise indicated. A double shaft screw extruder press Model ZSK 53 V manufactured by Werner & Pfleiderer, Stuttgard, with self-cleaning screws is used in all of the Examples. The length of the part in which the process takes place is approximately 42 times the diameter of the screw shaft which amounts to 53 mm. The same screw shaft equipment, with the portion carrying the kneading element amounting to about 20%, is used in all the Examples. The kneading elements are arranged in 3 kneading zones being located at the end of the first, second and third part of the extruder, respectively, as described in U.S. Pat. No. 3,963,679. The screw extruder consists of 12 housings, the first being equipped with a feed hopper. The function and mode of operation of the screw extruder and of the kneading and conveying elements of the shaft equipment, and the like, are described fully in the trade catalogues by Werner & Pfleiderer and in German Offenlegungsschrift No. 2,302,564 (U.S. Pat. No. 3,963,679).

EXAMPLE 1

The thermoplast which is to be modified is a polyurethane granulate which has been prepared from the following components:
- 100—parts of a polyester of adipic acid and ethylene glycol (molecular weight 2000),
- 10—parts of butanediol-(1,4),
- 0.5—parts of stearylamide and
- 41.5—parts of 4,4'-diphenylmethane diisocyanate (NCO/OH equivalent ratio=1.03).

The housings of the screw extruder were adjusted to the following temperatures:

| Housing: | 1 | 3 | 5 | 7 | 9 | 11 | 12 |
|---|---|---|---|---|---|---|---|
| Temperature (°C.): | 100 | 150 | 190 | 220 | 175 | 120 | 100 |

-continued

| Housing: | 1 | 3 | 5 | 7 | 9 | 11 | 12 |
|---|---|---|---|---|---|---|---|
| Head temperature: | 180° C. | | | | | | |

Experiment (a):

152 parts of the thermoplastic polyurethane are introduced into the hopper of the screw extruder. A mixture of
- 15—parts of 1,4-butanediol and
- 42.9—parts of 4,4'-diphenylmethane diisocyanate (NCO/OH) ratio=1.03)

is injected into the screw extruder through a feed inlet in housing 5. The products of the process has a hardness (Shore D) of 59 and a recoil elasticity of 36% (DIN 53 512).

Experiment (b):

A mixture of
- 20—parts of 1,4-butanediol and
- 36.9—parts of hexamethylene diisocyanate (NCO/OH ratio =0.99)

is injected into the molten thermoplastic polyurethane as in Experiment (a).

Experiment (c):

A mixture of
- 15—parts of 1,4-butanediol
- 42.9—parts of diphenylmethane diisocyanate and
- 10—parts of glass fibers is injected into the molten thermoplastic polyurethane through a feed inlet in housing 5 as in Experiment (a).

Experiment (d):

A mixture of
- 2.5—parts of 1,4-butanediol and
- 7.1—parts of diphenylmethane diisocyanates (NCO/OH ratio=1.03)

is injected into the molten thermoplastic polyurethane as in Experiment (a).

The products obtained in all of the experiments (b) to (d) are considerably improved in their strength properties compared with the unmodified polyurethane used as starting material. The product produced with the addition of glass fibers is particularly distinguished by its high rigidity and thermal stability under load.

Experiment (e):

A mixture of 100 parts of adipic acid/ethylene glycol polyester (molecular weight 2000), 25 parts of 1,4-butanediol, 0.5 parts of stearylamide and 84.4 parts of diphenylmethane diisocyanate is introduced into the intake zone of the screw extruder. This corresponds to the total reaction mixture used in Experiment (a), but various components used for forming the polyurethane are directly reacted by the one-shot process in the screw reactor in accordance with the process described in German Offenlegungsschrift 2,302,564. The product obtained has a hardness (Shore D) of 55 and a recoil elasticity of 33%. The processing cycle of the product in injection molding machines is longer by about 15% than that of the product of Experiment (a).

EXAMPLE 2

The thermoplast which is to be modified is a polyurethane which had been previously prepared in the same screw extruder by a semi-prepolymer process from
- 50—parts of polypropylene glycol (molecular weight 2000),
- 55.9—parts of diphenylmethane diisocyanate, (these components were introduced into housing No. 1)
- 50—parts of adipic acid/butanediol polyester (molecular weight 2000),
- 15—parts of 1,4-butanediol and
- 1—part of stearylamide (NCO/OH equivalent ratio=1.02).

(the latter three components were introduced into housing No. 5)

171.9 parts of the thermoplastic polyurethane are introduced into the hopper of the screw extruder. A mixture of 12.0 parts of tolylene diamine and 16.8 parts of 1-amino-3,3,5-trimethyl-5-aminoethyl-cyclohexane is injected through a second feed inlet in housing No. 5 and 45.3 parts of 1-isocyanato-3,3,5-trimethyl-5-isocyanatomethyl-cyclohexane (NCO/NH$_2$ ratio=1.02) is introduced through a third feed inlet in housing No. 6.

The housings of the screw extruder are adjusted to the following temperatures:

| Housing | 1 | 3 | 5 | 7 | 9 | 11 | 12 |
|---|---|---|---|---|---|---|---|
| Temperature (°C.): | 100 | 220 | 220 | 210 | 180 | 180 | 140 |
| Head temperature: | 200° C. | | | | | | |

A thermoplast with improved strength properties and very wide processing temperature range of 180° to 220° C. is obtained (starting material has a processing range of only 190° to 200° C.).

EXAMPLE 3

The thermoplast to be modified is a reaction product of
- 100—parts of adipic acid/butanediol polyester (OH number 53.3, acid number 0.6),
- 8.2—parts of ethylene glycol and
- 45.1—parts of diphenylmethane diisocyanate (NCO/OH ratio=1.00).

The solution viscosity is 2500 cP$_{25}$ (25% in DMG/MEK=3:1).

The housings of the screw extruder are adjusted to the following temperatures:

| Housing | 1 | 3 | 5 | 7 | 9 | 11 | 12 |
|---|---|---|---|---|---|---|---|
| Temperature (°C.): | 100 | 190 | 190 | 190 | 175 | 100 | 100 |
| Head temperature: | 190° C. | | | | | | |

153.3 parts of the thermoplastic polyurethane are fed into the hopper of the screw extruder. A mixture of
- 10.43—parts of the above-mentioned adipic acid/butane diol polyester,
- 0.86—parts of ethylene glycol and
- 5.52—parts of diphenylmethane diisocyanate (NCO/OH ratio=1.2)

is injected into the molten thermoplast in the housing 5. The product of the process is readily soluble and a 25% solution thereof in dimethylformamide/methyl ethyl ketone (3:1) has a viscosity of 8700 cP at 25° C.

Films produced from this product are much improved in strength compared with the starting product.

What is claimed is:

1. A process for the modification of a thermoplastic polymer comprising:
    I. introducing 70 to 98 parts by weight of thermoplastic polymer into an extruder at a first inlet;
    II. adding to said thermoplastic polymer through a second inlet 2 to 30 parts by weight of the following polyurethane forming components, such that the total parts by weight of the thermoplastic polymer and polyurethane components is 100:
        (A) organic polyisocyanate; and
        (B) chain lengthening agent with a molecular weight below 400 containing at least one hydroxyl group and/or amino group;
        wherein the ratio of isocyanate groups of component (A) to Zerewitinoff active groups of component (B) is in the range of from 0.90:1 to 1.2:1; and
    III. discharging from the extruder the product of the process.

2. The process of claim 1, wherein the temperature within said extruder is such that said thermoplastic polymer melts.

3. The process of claim 1, wherein said polyurethane forming components are added through several inlets.

4. The process of claim 1, wherein the reaction mixture is in said extruder for 0.3 to 30 minutes and the temperature within said extruder is from about 60° to 300° C.

5. The process of claim 1, wherein said organic polyisocyanate is diphenylmethane diisocyanate and/or hexamethylene diisocyanate.

6. The process of claim 1, wherein said chain lengthening agent is butanediol.

7. The process of claim 1, wherein said polyurethane forming components further comprises substantially linear polyols with molecular weights of 400 to 10,000.

8. The process of claim 1, wherein the thermoplastic polymer is a polyurethane.

9. The process of claim 1, wherein said chain lengthening agents have a molecular weight below 250.

10. The process of claim 1, wherein said proportion of isocyanate groups of component (A) to Zerewitinoff active groups of component (B) are in the range of 0.95:1 to 1.1:1.

11. The process of claim 1, wherein said extruder is a multi-shaft extruder.

12. The process of claim 11, wherein said multi-shaft extruder is a double shaft screw extruder with self-cleaning screws.

13. The process of claim 1, wherein 80 to 96 parts, by weight, is said thermoplastic polymer and 4 to 20 parts, by weight, is said polyurethane components (A) and (B).

* * * * *